Aug. 11, 1925.
G. FREEZE
1,549,530
DIRIGIBLE HEADLIGHT FOR VEHICLES
Filed April 15, 1924    2 Sheets-Sheet 1
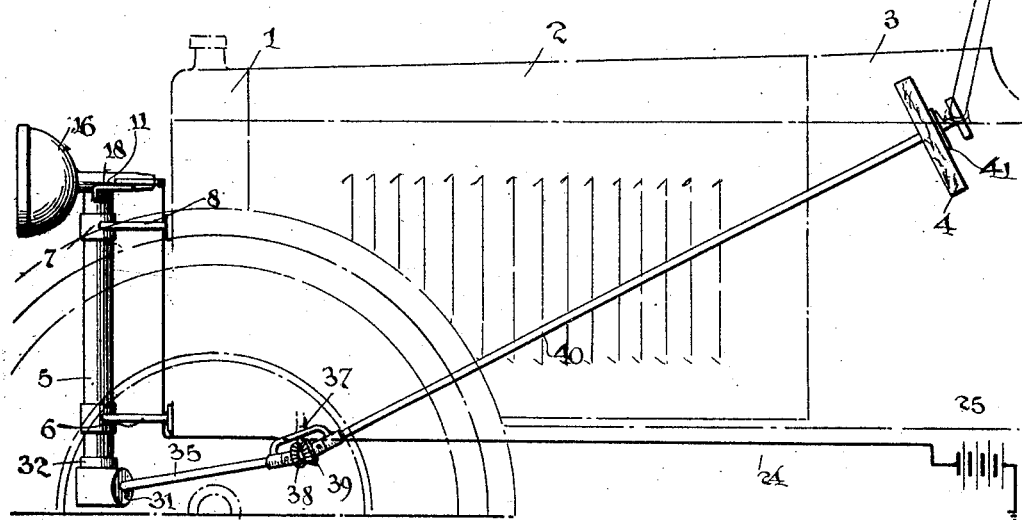
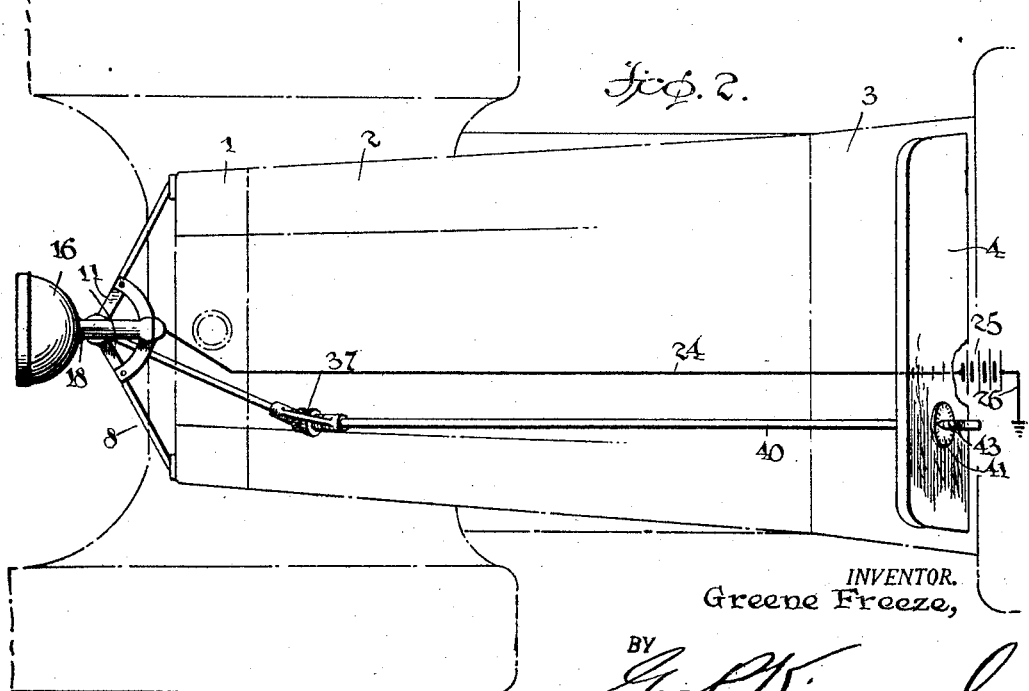
INVENTOR.
Greene Freeze,
BY
Geo. P. Kimmel
ATTORNEY.

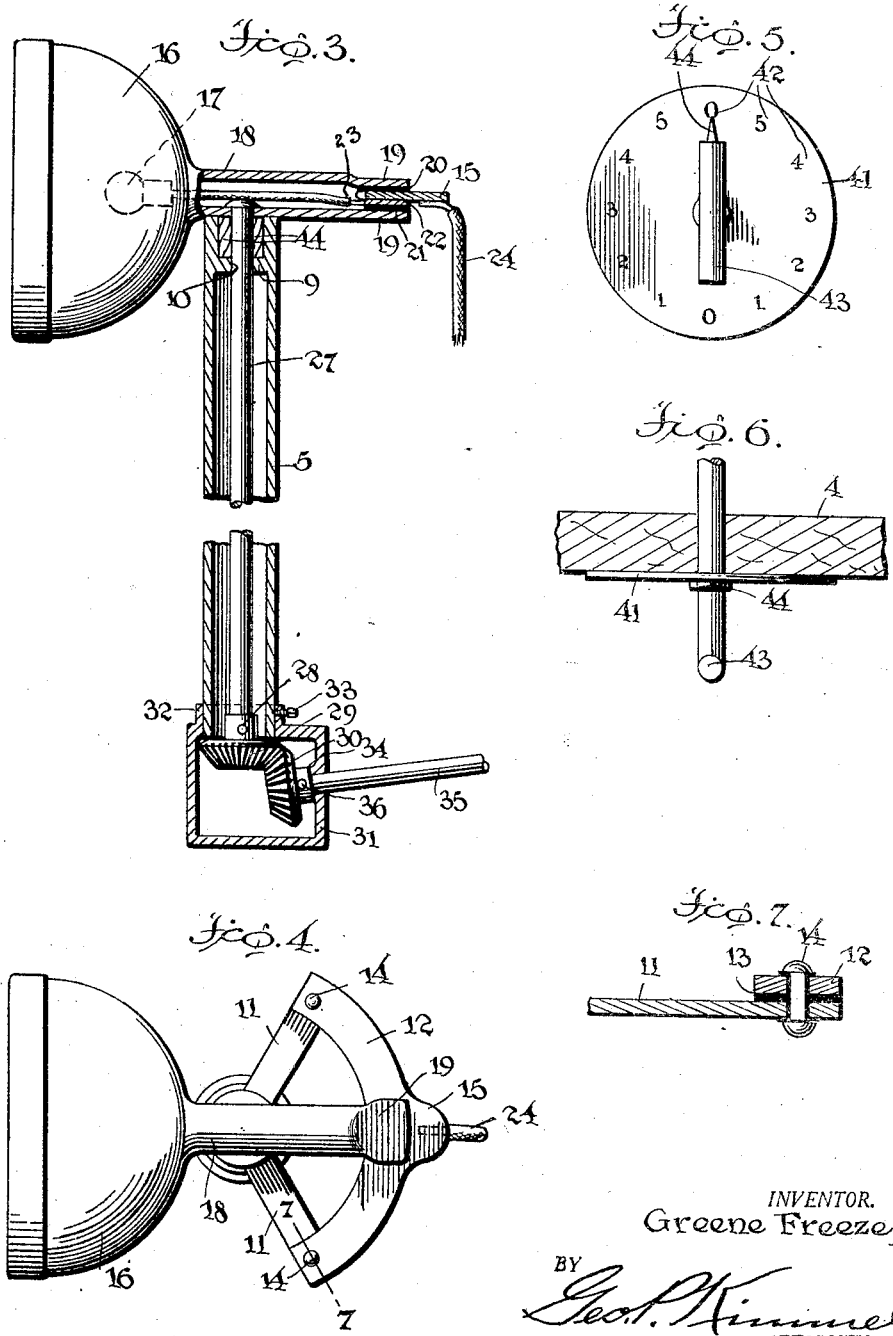

Patented Aug. 11, 1925.

1,549,530

UNITED STATES PATENT OFFICE.

GREEN FREEZE, OF CLIFFORD, ILLINOIS, ASSIGNOR OF ONE-FOURTH TO H. R. INGRA-HAM AND ONE-FOURTH TO GEORGE W. BROWN, BOTH OF CLIFFORD, ILLINOIS.

DIRIGIBLE HEADLIGHT FOR VEHICLES.

Application filed April 15, 1924. Serial No. 706,785.

*To all whom it may concern:*

Be it known that I, GREEN FREEZE, a citizen of the United States, residing at Clifford, in the county of Williamson and State of Illinois, have invented certain new and useful Improvements in Dirigible Headlights for Vehicles, of which the following is a specification.

This invention relates to dirigible headlights for vehicles, particularly automobiles.

The primary object of this invention is the provision, in a manner as hereinafter set forth, of a dirigible headlight for automobiles, adapted to be positioned centrally of the radiator of the machine and forwardly of the same and having control means whereby the light may be swung in a horizontal plane to project the light in any desired direction before the vehicle.

Another object of the invention is the provision, in a manner as hereinafter set forth, of a dirigible headlight for automobiles pivotally supported forwardly of the radiator of the machine and having improved continuous electrical contact means for continuously supplying current to the lamp during the movement thereof without danger of wearing out or breaking of wire connections running thereto.

The final object of the invention is the provision, in a manner as hereinafter set forth, of a dirigible headlight of simple and improved structure, strong, durable, efficient and inexpensive to manufacture and install.

The invention will be best understood from a consideration of the following detail description taken in connection with the accompanying drawings forming part of this specification, with the understanding that the invention is not confined to any strict conformity with the showing of the drawings, but may be changed and modified so long as such changes and modifications mark no material departure from the salient features of the invention as expressed in the appended claims.

In the drawings:

Figure 1 is a side elevation of the device embodying this invention shown as applied to an automobile forwardly of the radiator thereof and showing the control means for the light extending to the dash of the machine.

Figure 2 is a top plan view of the same.

Figure 3 is an enlarged longitudinal sectional view of the housing and arm supporting the headlight showing the interaction of the parts controlling the same.

Figure 4 is a top plan view of the headlight and housing supporting the same and the means employed for supplying electric current to the lamp within the projector.

Figure 5 is a plan view of the dial and controlling means by which the projector is shifted, which dial is adapted to be positioned upon the dash board of the machine.

Figure 6 is a top plan view of the dial and control, shown applied to the dash, the dash being in section.

Figure 7 is a detail sectional view taken upon the line 7—7 of Figure 4.

Referring now to the drawings in detail wherein like numerals of reference indicate corresponding parts throughout the several views of the drawings, there is shown, in Figures 1 and 2, the forward portion of an automobile showing the radiator 1, the engine hood 2, the forward portion of the body 3, and the dash board 4, the latter being in section.

The device embodying this invention comprises, a tubular housing 5 adapted to be positioned, in vertical position, forwardly of the radiator 1 of the machine and there supported in any suitable manner. Applicant has shown in the drawings a forwardly extending arm 6 projecting from the lower portion of the radiator or the front cross piece of the chassis of the machine and surrounding the lower portion of the casing 5 and at the upper part of the casing there is provided a sleeve 7 surrounding the casing and having diverging arms 8 which extend to each side of the radiator and are secured thereto, to brace the housing against lateral movement. This particular manner of supporting the tubular housing and the lamp forwardly of the machine may be replaced by any other suitable support and brace means, according to the type of machine upon which the device is to be used and the position occupied by the device on the machine.

The vertical casing 5 is open at both of its ends, but it has extending transversely thereof and inwardly of its upper end a partition or wall 9 which has a central aperture 10 therethrough. Extending laterally from the upper end of the casing 5 and in diverging angular relation one to the other, is a pair of supporting arms 11 and these arms support at their outer ends arcuate shaped metal plate 12. This arcuate shaped plate is separated from the arms 11 by means of insulation 13. Bolts or rivets or other suitable securing means 14 extend through the plate, insulation, and arms to secure the same together. Extending radially from the outer edge of the arcuate plate 12 is an integral lug 15, the purpose of which will be made apparent hereafter.

A projector of ordinary construction is indicated at 16 and has therein the usual incandescent lamp 17. This projector has connected to its body at the rear portion thereof an arm 18, which assumes a horizontal position when the device is assembled, and this arm is tubular and has its free end slotted horizontally to form the bifurcated end, and the upper and lower furcations are flattened as at 19 and are adapted to be positioned one above and the other below the arcuate shaped plate 12. Located between the upper of the furcations 19 and the arcuate plate 12 is a body of insulation 20 and positioned between the lower of the furcations 19 and the under side of the arcuate plate 12 is a second body of insulation 21 and a metal contact plate 22. As is clearly shown in Figure 3 the metal contact plate contacts with the under side of the arcuate plate 12 and is insulated from the lower furcation 19 by the body of insulation 21. An electrical conducting element 23 is connected to the contact plate 22 and extends therefrom to the incandescent lamp 17 in the projector. The projection 15 of the plate 12 has connected thereto an electrical conductor 24 which runs thereto from a battery 25 which is grounded as at 26 to the frame. One end of the filament of the lamp being grounded also, electrical circuit is completed from the battery through the plate 12 and the conductors 22 and 23 to the lamp and back from the lamp through the frame to the battery.

The tubular arm 18 is mounted upon the upper end of the casing 5 and the under side of the arm has an aperture therethrough to receive the upper end of a shaft 27, which shaft is secured to the arm in the aperture and extends downwardly through the aperture 10 in the partition 9 of the casing to the lower end of the casing. Secured to the lower end of the shaft 27 by means of a pin 28 or other appropriate means, is a bevelled gear 29 which meshes with a second bevelled gear 30 positioned therebeneath. These bevelled gears are housed at the lower end of the casing 5 in a housing 31, which housing has at its top side an upstanding collar 32 adapted to surround the lower end of the housing 5 and be secured thereto by means of a set screw 33 or other appropriate securing means. The housing 31 has through one side an aperture formed to provide a bearing 34 through which extends a shaft 35 the end of which is secured by means of a pin 36 to the bevelled gear 30.

The other end of the shaft 35 is supported by one arm of a double armed bearing 37 which bearing 37 is supported at any convenient point beneath the hood 2 of the machine. A gear 38 is carried at the other end of the shaft 35 which gear meshes with a gear 39 carried by a shaft 40 the forward end of which is supported by the other arm of the double bearing 37. This shaft 40 extends rearwardly under the hood 2 of the machine to and through the dash board 4.

Located upon the face of the dash board 4 is a circular disc 41 through the center of which the shaft 40 extends. This disc 41 is calibrated as indicated at 42, and the extended end of the shaft 40 carries thereon a combined grasping or actuating means and a pointer 43 and 44, respectively.

Located in the upper portion of the housing 5 which surrounds the revoluble shaft 27, and supported upon the partition 9 and surrounding the shaft 27 is a roller bearing 43.

From the foregoing description it may be seen that an improved dirigible headlight is provided and so constructed and positioned upon a vehicle that the driver thereof may readily shift the projector 16 in a horizontal plane to project the beams of light to any portion of the road desired, by merely grasping and turning the actuating knob 43 thereby revolving the shaft 40 which communicates the movement to the short shaft 35 and which in turn revolves the vertical shaft 27 to swing the arm 18 and the projector 16 to the desired position. The contact plate 22 carried by the lower furcation 19 of the arm 18 ensures constant and perfect electrical contact with the arcuate plate 12 which is charged from the conductor 24, without the danger of twisting and breaking conductor wires and short circuiting the lamp as is the case in other movable lamps where the wires are moved and twisted with every movement of the lamp.

Having thus described my invention what I claim is:

1. A dirigible headlight comprising, a projector, an incandescent lamp therein, a hollow arm extending rearwardly therefrom, said arm having its free end bifurcated, a support for said projector to which said arm is pivotally connected, a fixed arcuate plate engaging between the furcations of said arm, an electrical conducting means engaging said plate, means carried by one of said furcations and slidably engaging said plate for collecting electrical energy therefrom, and means for conducting said collected energy to said lamp within the projector.

2. A dirigible headlight comprising, a vertical tubular casing, means to provide a projecting support at the upper end of said casing, an arcuate plate carried upon said support, a light projector having a rearwardly extending arm mounted to revolve upon the upper end of said casing, said arm being transversely slotted to form a bifurcated end, the furcations extending one on each side of said plate and guided thereby, means connecting with said plate for conveying electrical energy thereto, means for conveying such energy from said plate through said furcations to said projector, a revoluble shaft in said casing engaging said arm, and revoluble means engaging the lower end of said shaft and adapted to be actuated from a point remote from said headlight to shift the same.

In testimony whereof, I affix my signature hereto.

GREEN $\overset{\text{His}}{\times}$ FREEZE.
mark